US011061733B2

(12) United States Patent
Veale et al.

(10) Patent No.: US 11,061,733 B2
(45) Date of Patent: Jul. 13, 2021

(54) SHARED AND EXCLUSIVE ACCELERATOR ACCESS

(71) Applicant: International Business Machines Corporation, Armonk, NY (US)

(72) Inventors: Brian F. Veale, Cedar Park, TX (US); Bruce Mealey, Austin, TX (US); Andre L. Albot, Austin, TX (US); Nick Stilwell, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 160 days.

(21) Appl. No.: 16/117,025

(22) Filed: Aug. 30, 2018

(65) Prior Publication Data

US 2020/0073721 A1 Mar. 5, 2020

(51) Int. Cl.
*G06F 9/46* (2006.01)
*G06F 9/50* (2006.01)
*G06F 9/48* (2006.01)

(52) U.S. Cl.
CPC .......... *G06F 9/5055* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 6,954,424 B2 | 10/2005 | Barrack et al. | |
| 7,719,964 B2 | 5/2010 | Morton | |
| 8,429,661 B1* | 4/2013 | Alfieri | G06F 9/544 |
| | | | 718/104 |
| 9,720,838 B2 | 8/2017 | Das Sharma et al. | |
| 9,940,287 B2 | 4/2018 | Das Sharma | |
| 2011/0010721 A1* | 1/2011 | Gupta | G06F 9/5077 |
| | | | 718/103 |
| 2018/0095750 A1 | 4/2018 | Drysdale et al. | |

OTHER PUBLICATIONS

Anonymous, "A System and Method of Data Access for Credit Scoring" IP.com, IPCOM000241357D, Apr. 21, 2015. 6 pages.
Anonymous, "Method and Apparatus for Internet Service Access Accelerator" IP.com, IPCOM000229589D, Aug. 6, 2013. 7 pages.
Lena E. Olson et al., "Border Control: Sandboxing Accelerators" 2015 48th Annual IEEE/ACM International Symposium on Microarchitecture (MICRO) Dec. 5-9, 2015. 12 pages.
Tao Chen et al., "Timing Channels through Shared Hardware Accelerators: Attacks and Protection" ECE 5775 High-Level Digital Design Automation. 1-12.

* cited by examiner

*Primary Examiner* — Gregory A Kessler
(74) *Attorney, Agent, or Firm* — Cantor Colburn LLP; David Quinn

(57) ABSTRACT

A digital computing system is configured to control access to an accelerator. The system includes a processor that executes an application, and an accelerator that performs a data processing operation in response to an access request output from the application. The system further includes a virtual accelerator switchboard (VAS) to determine an availability of at least one shared credit corresponding to the accelerator and assign an available shared credit to the application. The application submits a request to access the accelerator using the assigned shared credit.

14 Claims, 6 Drawing Sheets

US 11,061,733 B2

SHARED AND EXCLUSIVE ACCELERATOR ACCESS

BACKGROUND

The invention relates generally to digital computing system, and more particularly, to computing systems that implement computing accelerators.

Multi-core based computing systems can be used to solve a number of data and/or compute intensive problems. Computers with multiple cores can be used within a data center, server farm, or some other suitable facility. Associated with these cores may be one or more accelerators dedicated to specific computational tasks. For example, various types of accelerators can be employed including, but not limited to, an accelerator Central Processing Unit (CPU), on-chip accelerators, cryptographic accelerators, encoding/decoding accelerators, and network accelerators.

SUMMARY

According to a non-limiting embodiment, a digital computing system is configured to control access to an accelerator. The system includes a processor that executes an application, and an accelerator that performs a data processing operation in response to an access request output from the application. The system further includes a virtual accelerator switchboard (VAS) to determine an availability of at least one shared credit corresponding to the accelerator and assign an available shared credit to the application. The application submits a request to access the accelerator using the assigned shared credit.

According to another non-limiting embodiment, a method for controlling access to an accelerator of a computer is provided. The method comprises executing, via a processor, an application, and outputting, via the application, an access request to perform a data processing operation via the accelerator. The method further comprises determining an availability of at least one shared credit corresponding to the accelerator and assigning an available shared credit to the application. The method further comprises submitting, via the application, a request to access the accelerator using the assigned credit.

According to still another non-limiting embodiment, a computer program product is provided. The computer program product includes a computer readable storage medium having program instructions embodied therewith. The program instructions are executable by a computer processor to cause the computer processor to perform a method for controlling access to an accelerator of a computer. The method incudes executing, via a processor, an application, and outputting, via the application, an access request to perform a data processing operation via the accelerator. The method further comprises determining an availability of at least one shared credit corresponding to the accelerator and assigning an available shared credit to the application. The method further comprises submitting, via the application, a request to access the accelerator using the assigned credit.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
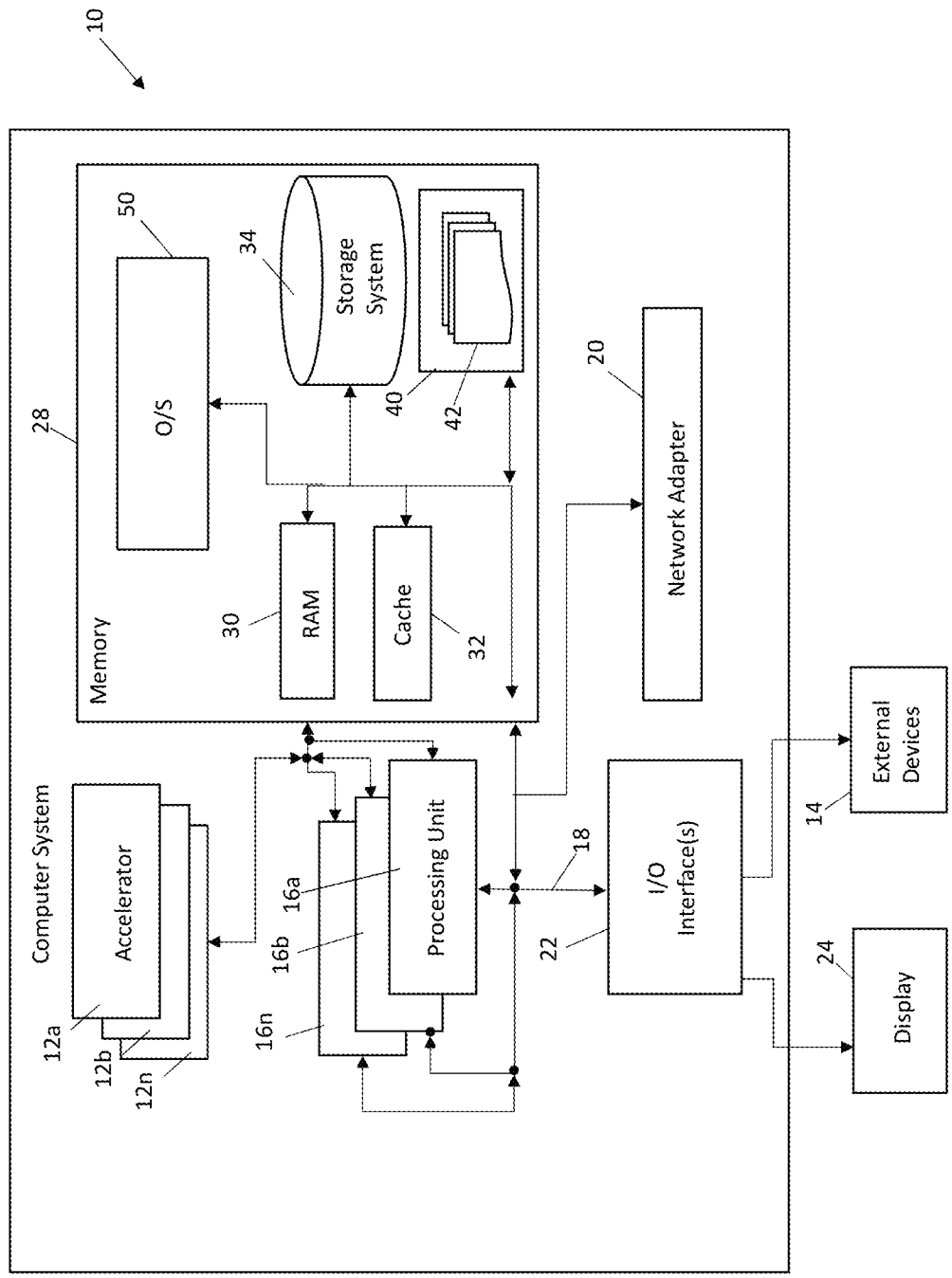
FIG. 1 is a block diagram illustrating a computer system which is capable of controlling access to an accelerator in accordance with various embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, modern processors can implement an accelerator that can be accessed or invoked via a Virtual Accelerator Switchboard (VAS). In the VAS implementation, an application registers with the operating system (OS) to gain access to an accelerator. The application issues a request to access an accelerator, which is first received by the VAS. The VAS uses send windows and receive windows to transmit data (e.g., access requests, intended function data, data to be processed, etc.) between an application and a receiving accelerator. In at least one embodiment described herein, the number of requests that can be sent by an application or received by an accelerator is controlled by credits that are allocated to the send and receive window. When the send window does not have send credits or the receive window does not have receive credits, the VAS denies the exchange (e.g., the access request) between the application and the accelerator. In at least one embodiment, the system provides certain applications or high-priority applications exclusive access to accelerators in order to ensure the quality of service, while also allowing lower-priority applications to take advantage of free or available accelerator cycles using shared access of non-exclusive accelerator resources.

As described herein, one or more embodiments address the above-described shortcomings of the prior art by providing a computing system capable of controlling access to one or more accelerators by categorizing credits as either shared credits or exclusive credits. Exclusive credits aim to provide selected or predetermined high-priority applications with reserved access to an accelerator, while shared credits still allow other applications the ability to access an available or non-reserved accelerator. In this manner, Referring now to FIG. 1, a computer system 10 capable of controlling access to one or more accelerators 102 is illustrated according to a non-limiting embodiment. As shown in FIG. 1, computer system 10 is shown in the form of a general-purpose computing device, also referred to as a processing device. The components of computer system may include, but are not limited to, one or more accelerators 12a, 12b, 12n, one or more processors or processing units 16a, 16b, 16n, system memory 28, and a bus 18 that couples various system components.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include an operating system (OS) 50, along with computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

The OS 50 controls the execution of other computer programs and provides scheduling, input-output control, file and data management, memory management, and communication control and related services. The OS 50 can also include a library API (not shown in FIG. 1). The library API is a software library comprising APIs for performing the data manipulation functions provided by the specialized hardware devices such as, for example, the accelerators 12a, 12b, 12n. The 12a, 12b, 12n are sometimes referred to as a "co-processors" and typically performs a dedicated computing function including, but not limited to, CPU processes, cryptographic operations and calculations, encoding/decoding processes, and network operations. By off-loading a particular computing function to a dedicated accelerator, the overall computing speed of the computing system can be increased.

The storage system 34 can store a basic input output system (BIOS). The BIOS is a set of essential routines that initialize and test hardware at startup, start execution of the OS 50, and support the transfer of data among the hardware devices. When the computer system 10 is in operation, the processors 16a-16n are configured to execute instructions stored within the storage system 34, to communicate data to and from the memory 28, and to generally control operations of the computer system 10 pursuant to the instructions.

The accelerators 12a, 12b, 12n are in signal communication with each processor 16a-16n, along with the system memory 28, and can operate as a hardware accelerator. In at least one embodiment, there is a one-to-one relationship between the number of processors 16a, 16b, 16n, etc., and the number of accelerators 12a, 12b, 12n.

Each accelerator 12a, 12b, 12n can apply various computing operations including, but not limited to, compression algorithms or decompression algorithms, sometimes referred to as hardware compressions or hardware decompressions, to data or data streams requested by an application, sometimes referred to as a "process" or "thread". Various lossless compression algorithms, for example, can be executed by the accelerator to reduce the size of data or a data stream requested by an application. Although the application is described herein in terms of issuing compression requests, the application is not limited thereto and can apply in a similar manner to decompression requests.

Program/utility 40, having a set (at least one) of program modules 42, may be stored in memory 28 by way of example, and not limitation, as well as the OS 50, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, data archival storage systems, etc.

Figure 2:
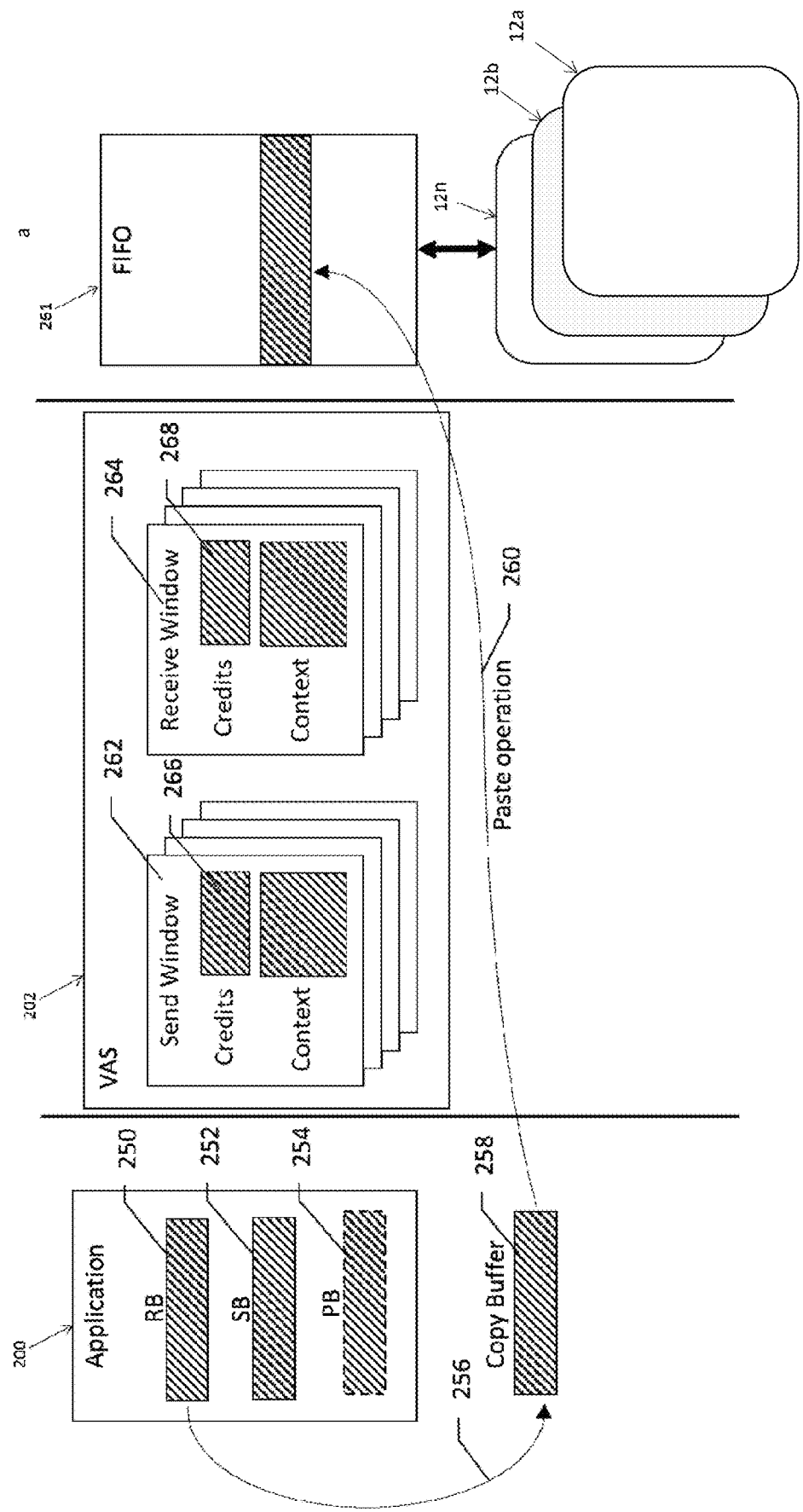
FIG. 2 is a block diagram of illustrating communication between an application, virtual accelerator switchboard, and an accelerator according to one or more embodiments of the present invention.

FIG. 2 illustrates the computing system 100 in greater detail. The computer system 100 (e.g., processing unit 16a-16n) is configured to execute one or more applications 200, sometimes referred to as "processes". The application 200 can obtain access to an accelerator 12a, 12b, 12n via a virtual accelerator switchboard (VAS) 202. In one or more embodiments, the accelerators are configured as NX accelerators. An NX accelerator is configured to operate along with the VAS 202 to perform dedicated cryptographic algorithms and cryptographic computing schemes. The NX accelerator is also capable of performing lossless on-chip data compression and decompression operations. Although an NX accelerator is mentioned above, other types of accelerators can be employed without departing from the scope of the invention.

The application 200 registers with the OS (not shown in FIG. 2) to gain access to an accelerator 12a, 12b, 12n. In return, the application 200 is provided with an effective address (EA) at which to paste a request block (RB) 250. The RB 250 contains request information including, but not limited to, the function to be performed, the EAs of the source and target data, the length of the source and target data, and the EA of a status block (SB) 252 where completion status will be written by an accelerator 12a, 12b, 12n. Additionally, an optional parameter block (PB) 254 can be provided that defines input and output parameters for a given accelerator 12a, 12b, 12n.

To facilitate a request to an accelerator 12a, 12b, 12n a copy instruction 256 is issued, which copies the cache-line containing the RB into a copy buffer 258. The buffered data including the RB is then output as a paste instruction 260 and serves to transfer the contents of the copy buffer to the 'paste address' corresponding to the RB. The paste instruction 260 is received at a first-input/first-output buffer 261, which is then delivered to an accelerator 12a, 12b, 12n associated with the EA in the paste instruction 260.

Upon completion of the request by an accelerator 12a, 12b, 12n, a memory controller (not shown) generates PB output data/parameters, a completion code indicating whether the request completed with an error or exception (zero indicates no error or exception condition) and sets a valid bit of the SB. Optionally, an interrupt notification can be sent when the RB has completed.

The VAS 202 uses send windows 262 and receive windows 264 to transmit data between an application 200 and a receiving accelerator 12a, 12b, 12n or another application (not shown). In one or more embodiments described herein, the number of access requests that can be sent and received is controlled by credits 266 and 268 that are allocated to the send and receive windows 262 and 264. If the send window 262 does not contain send credits 266 or the receive window does not contain receive credits 268, the paste command 260 will fail, i.e., will be denied by the VAS 202.

As described herein, various non-limiting embodiments provide a scheme of allocating shared credits and exclusive credits to one or more applications or processes to control access to an accelerator. Unlike conventional credit-based schemes, various embodiments described herein share credits between accelerators based on two different credit categories. That is, two different types of credits are selected from two different pools. One category of credits is reserved for exclusive applications afforded exclusive access, while the other credits are available to non-exclusive applications that can request and utilize shared credits without reserving exclusive access to an accelerator. In at least one embodiment, the categorized credits include exclusive credits and shared credits.

Exclusive credits are associated to a single accelerator dedicated to performing a particular process or function. In this manner, the application or owner running the application is always ensured access to submit work or request process from a corresponding accelerator.

Shared credits, on the other hand, refer to credits that are shared among multiple users or multiple applications. This type of credit does not ensure that work can be submitted to an accelerator, or that work or an access request will be processed or performed by an accelerator in a timely manner.

In either case, described above, each credit is mapped to a given accelerator's VAS send window. However, the credits are not shared between windows. In this manner, the system provides enhanced performance for applications with exclusive access to the accelerators while also allowing applications that do not need performance guarantees (e.g., non-exclusive applications) the ability to utilize an available shared-access accelerator.

Figure 3A:
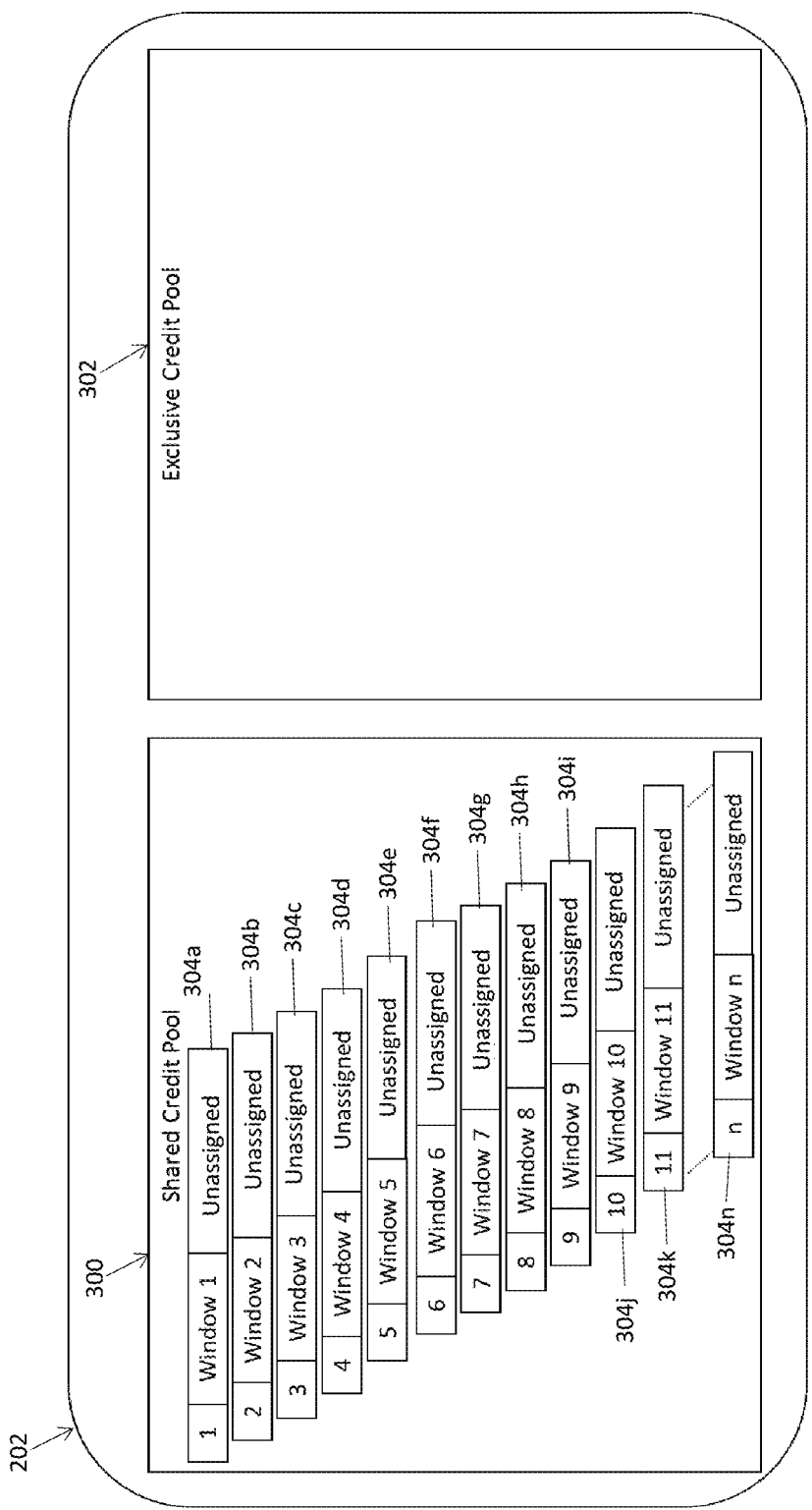
FIG. 3A depicts an initial state of a shared credit pool and exclusive credit pool according to non-limiting embodiments of the present invention.

In at least one embodiment, the VAS 202 generates a shared credit pool 300 and an exclusive credit pool 302. The shared credit pool 300 and the exclusive credit pool 302 can be an area of memory configured to store or contain data defining one or more credits. For example, one unassociated credit 304a-304n per VAS send window (1-n) is initially organized into the shared credit pool 300 (see FIG. 3A). In other embodiments, the OS (e.g., processing unit) can generate the shared and exclusive pools 300 and 302, along with the credits 304a-304n. In this embodiment, the OS manages the credit pools, and outputs the current state of the credit pools 300, 302 and credits 304a-304n to the VAS 202. Based on the output of the OS, the VAS 202 determines whether to allow or deny access requests from one or more applications.

Figure 3B:
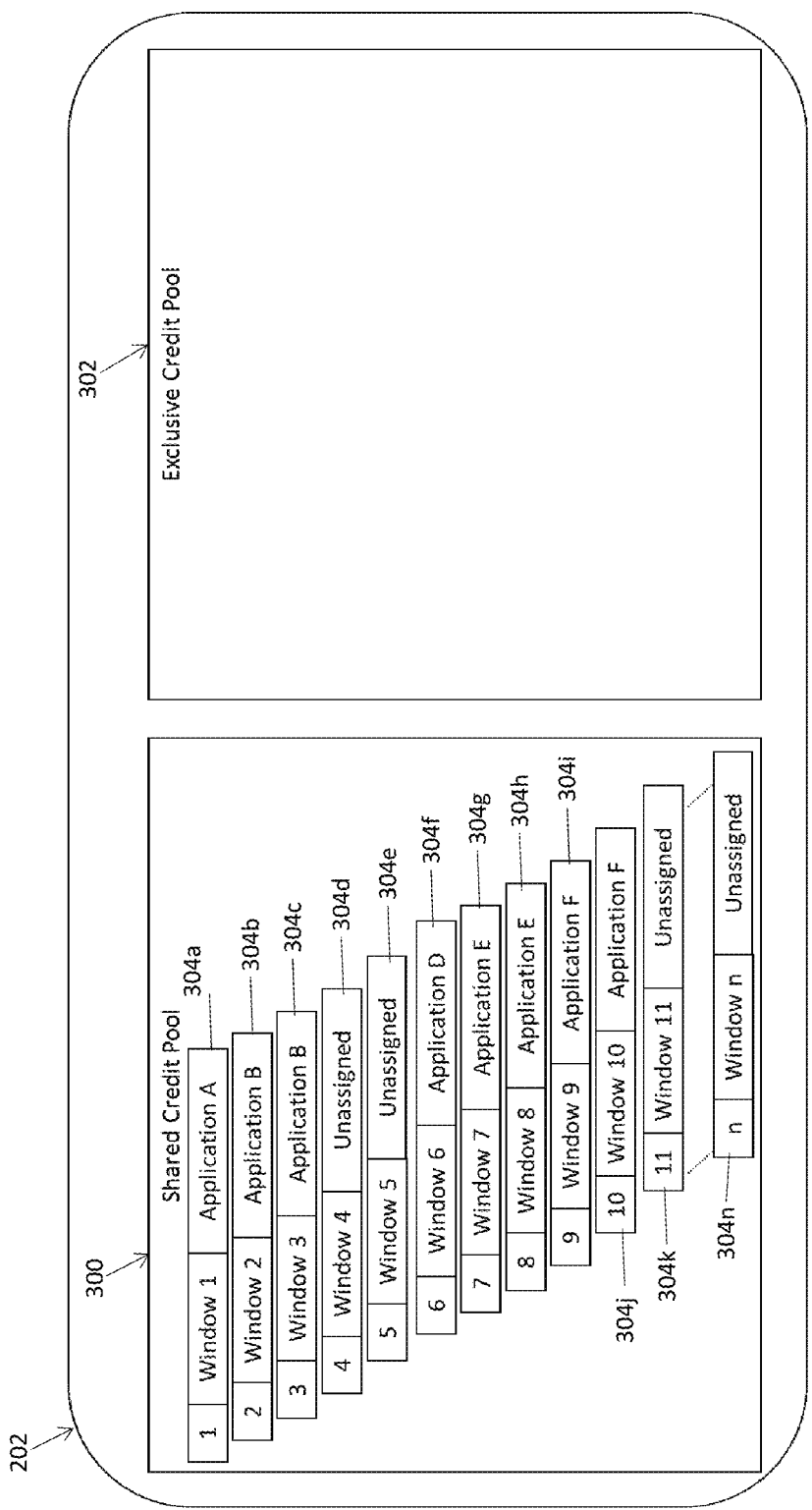
FIG. 3B depicts the state of the shared credit pool and exclusive credit pool after associated shared credits to an application according to non-limiting embodiments of the present invention.

As applications request a shared credit 304a-304n to access an accelerator, credits are selected from the shared credit pool 300 and are associated to the application currently issuing the access request (see FIG. 3B). Accordingly, credits are dynamically associated to an available accelerator capable of performing the requested function, and the associated credit is provided to the application currently requesting access to an accelerator.

In other embodiments, one or more credits in the shared pool 300 are pre-associated to an accelerator dedicated to performing a particular function. Accordingly, when an application requests access to an accelerator that performs a particular function, the system determines whether credits corresponding to the accelerator of the desired function are available. In any case, the shared credits are available to non-exclusive applications, which can request and utilize the shared credits without reserving exclusive access to an accelerator.

When there are no available credits in the shared credit pool 300, the VAS 202 or the OS (e.g., the processing unit) may revoke a shared credit from an existing process based on one or more heuristics. The heuristics include, but are not limited to, revoking the least recently used credit or taking a credit away from an application that is heavily consuming an accelerators processing resource, time of accelerator use, and number or processing request. In this manner, other applications can be provided access to the accelerators.

Figure 3C:
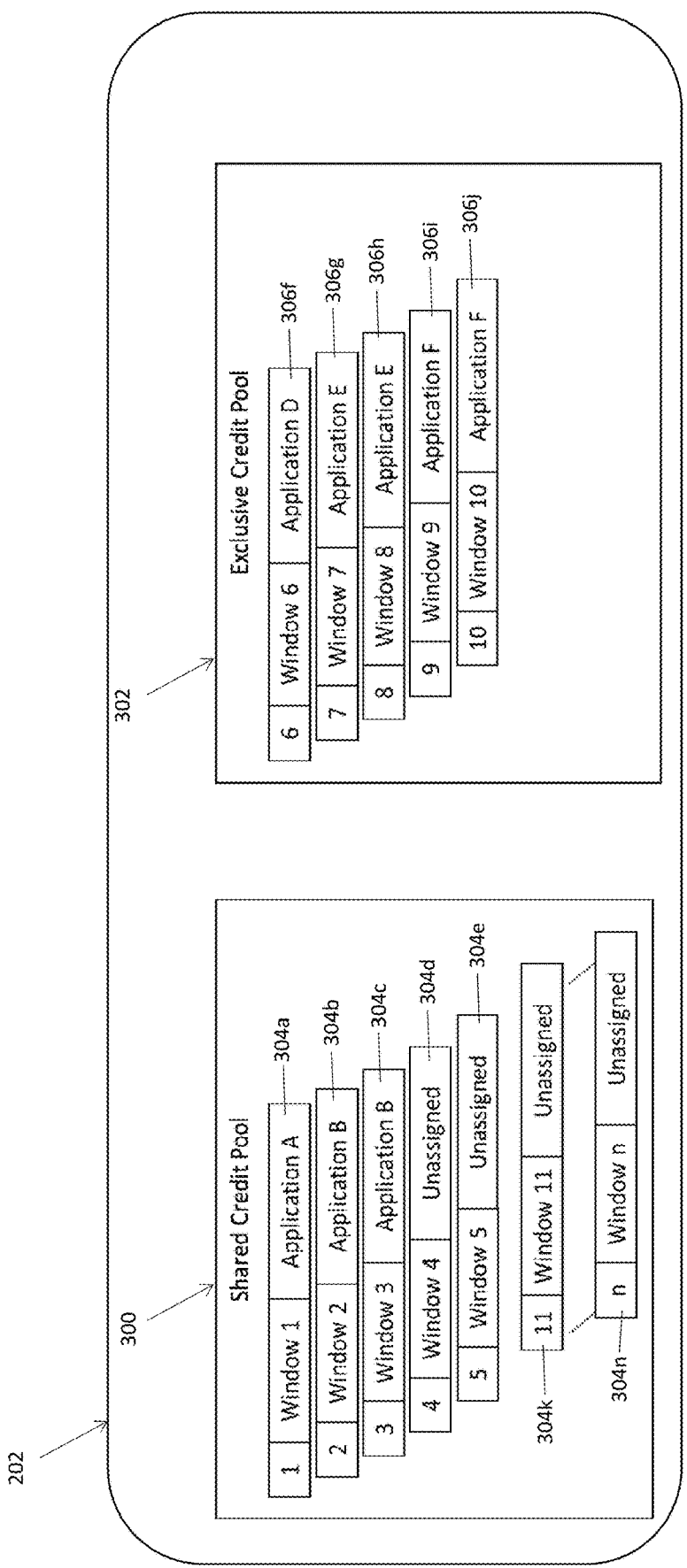
FIG. 3C illustrates the state of the shared credit pool and exclusive credit pool after shared credits are associated to exclusive applications according to non-limiting embodiments of the present invention.

When a process requests exclusive access to an accelerator, the VAS 202 removes a shared credit from the shared credit pool 300 and places it into the exclusive credit pool 302. The credits transferred to the exclusive pool 302 are deemed to be exclusive credits 306f, 306g, 306h, 306i, 306j (see FIG. 3C). The exclusive credits are reserved for exclusive applications that are afforded exclusive access to a given accelerator. In at least one embodiment, the VAS 202 or OS may store a look-up table (LUT) indicating which applications are deemed to be exclusive applications and non-exclusive applications.

An exclusive application (e.g., application D, E, F) provided with a respective exclusive credit (e.g., 306f-306j) owns the credit until it releases the accelerator window or until the desired function is completed. In at least one embodiment, exclusive credits 306f-306j are not revoked unless an accelerator is removed from the system, partition, or a virtual machine (VM).

Figure 4:
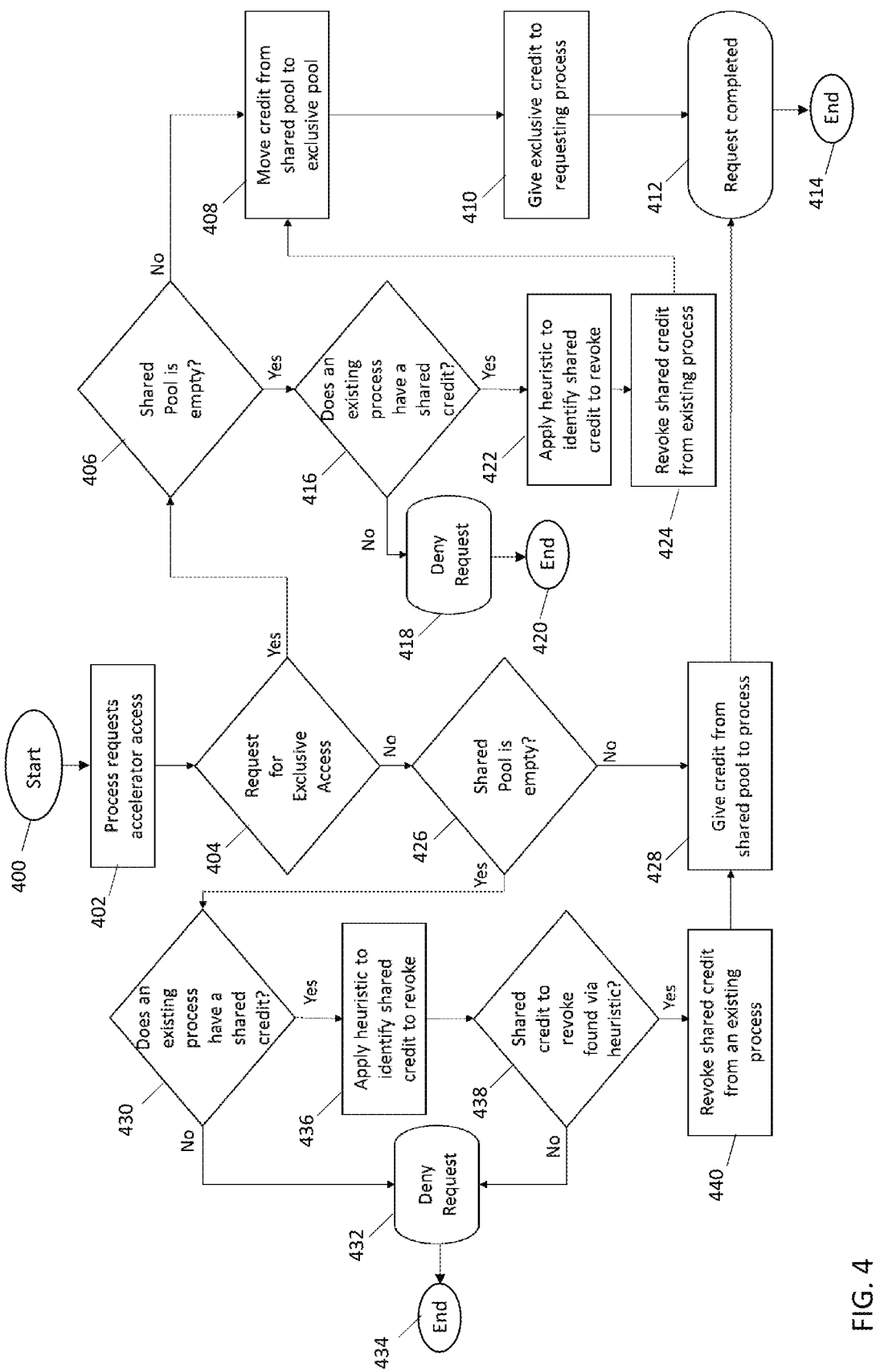
FIG. 4 is a flow diagram illustrating a method of controlling access to an accelerator according to one or more embodiments of the present invention.

Turning now to FIG. 4, a method of controlling access to an accelerator is illustrated according to a non-limiting embodiment. The method begins at operation 400, and at operation 402 a processor or application outputs a request to access an accelerator. At operation 404, a determination is made as to whether the request is an exclusive request or a shared request. An exclusive request is an accelerator request issued by a selected or high-priority application that is allowed exclusive access to an accelerator. All other requests are deemed to be shared requests, which are issued by applications that can obtain access to an accelerator when shared access is available. When the request is for exclusive access, the method proceeds to operation 406 and determines whether the shared credit pool is empty. When the shared credit pool is not empty, a shared credit is selected from the pool and transferred to the exclusive credit pool at operation 408. At operation 410, the transferred exclusive credit is associated to the application currently requesting exclusive access. At operation 412, the exclusive access request is deemed complete, and the method ends at operation 414.

When, however, the shared credit pool is empty at operation 406, the method proceeds to operation 416 and determines whether an ongoing process or application is running according to a shared credit. A shared credit is not exclusive to the running application, and therefore can be revoked by the system. When there are no applications or processes running according to a shared credit, the current access request is denied at operation 418 and the method ends at operation 420.

When, however, there are one or more applications or processes running according to a shared credit, one or more heuristic processes are performed at operation 422 to determine which shared credit to revoke and reassign. At operation 424, a shared credit is identified and is revoked from its corresponding non-exclusive application, and is transferred into the exclusive credit pool at operation 408. At operation 410, the revoked credit is re-associated to the application currently requesting exclusive access. Accordingly, the exclusive access request is deemed complete at operation 412, and the method ends at operation 414.

Returning to operation 404, the method proceeds to operation 426 when the current request is a shared access request as opposed to an exclusive access request. At this stage, a determination is made as to whether a shared access pool is empty. When the shared access pool is not empty, a shared credit is selected from the pool and associated to the application or process currently requesting access to the application at operation 428. At operation 412, the current access request is deemed complete, and the method ends at operation 414.

When, however, the shared credit pool is empty at operation 426, the method proceeds to operation 430 to determine whether an ongoing process or application is running according to a shared credit. When there are no applications or processes running according to a shared credit, the current access request is denied at operation 432 and the method ends at operation 434.

When, however, there are one or more applications or processes running according to a shared credit, one or more heuristic processes are performed at operation 436 to identify the running shared credit. At operation 438, a determination is made as to whether any of the identified shared credits can be revoked. When no revocable shared credits are available, the current access request is denied at operation 432 and the method ends at operation 434. Otherwise, the identified shared credit is revoked from the corresponding non-exclusive application at operation 440, and is re-associated to the application currently requesting the shared access at operation 428. Accordingly, the current access request is deemed complete at operation 412, and the method ends at operation 414.

Various technical benefits are achieved using the system and methods described herein, including the capability of providing enhanced performance for applications with exclusive access to the co-processors while also allowing applications that do not need performance access to accelerators when shared access is available. In this manner, the computer system can realize performance gains through the use of co-processors in the system, thereby improving overall processing speeds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of controlling access to an accelerator installed in a digital computing system, the method comprising:

executing, via a processor, an application;

outputting, via the application, an access request to perform a data processing operation via the accelerator;

determining an availability of at least one shared credit corresponding to the accelerator and assigning an available shared credit to the application;

submitting, via the application, a request for shared access of the accelerator using the assigned available shared credit;

providing access to the application that has requested the shared access by identifying the available shared credit, and assigning the available shared credit to the application when it is available in a shared credit pool, wherein the at least one shared credit is different from at least one exclusive credit; and transferring a shared credit from the shared credit pool to an exclusive credit pool in response to the application requesting exclusive access to the accelerator, wherein the transferred shared credit is included among the at least one exclusive credit.

2. The method of claim 1, further comprising providing access to the application that has requested exclusive access to the accelerator by identifying the at least one exclusive credit and assigning it to the application when the at least one exclusive credit is available in the exclusive credit pool independent from an availability of shared credits in the shared credit pool.

3. The method of claim 2, further comprising denying access to the application that has requested shared access to the accelerator when no shared credits are available in the shared credit pool.

4. The method of claim 2, further comprising in response to the application requesting exclusive access and no shared credits are available in the shared credit pool, revoking a currently shared credit from a currently operating application that is holding a shared credit and assigning the revoked credit to the application requesting exclusive access.

5. The method of claim 4, further comprising, in response to determining the application is an exclusive application outputting the access request and no shared credits are available in the shared credit pool, revoking a currently shared credit from a currently operating shared application and associating the revoked credit to the exclusive application.

6. A digital computing system configured to control access to an accelerator, the system comprising:

a shared credit pool configured to store the at least one shared credit;

an exclusive credit pool configured to store at least one exclusive credit;

a processor configured to execute an application;

an accelerator in signal communication with the processor, the accelerator configured to perform a data processing operation in response to an access request output from the application; and a virtual accelerator switchboard (VAS) in signal communication with the processor and the accelerator, the VAS configured to determine an availability of at least one shared credit corresponding to the accelerator and assign an available shared credit to the application, wherein the VAS transfers a shared credit from the shared credit pool to the exclusive credit pool in response to the application requesting exclusive access to the accelerator, the transferred shared credit included among the at least one exclusive credit, wherein the application submits a request for shared access of accelerator using the assigned available shared credit, wherein the VAS provides access to the application that has requested the shared access by identifying the available shared credit, and assigning the available shared credit to the application when it is available in the shared credit pool, wherein the at least one shared credit is different from at least one exclusive credit.

7. The system of claim 6, wherein the VAS provides access to an application that has requested exclusive access to the accelerator by identifying an exclusive credit and assigning it to the application and at least one exclusive credit is available in the exclusive credit pool independent from an availability of shared credits in the shared credit pool.

8. The system of claim 7, wherein the VAS denies access to an application that has requested shared access to the accelerator and no shared credits are available in the shared credit pool.

9. The system of claim 8, wherein the processor transfers a shared credit from the shared credit pool to the exclusive credit pool in response to an application requesting exclusive access to the accelerator.

10. The system of claim 9, wherein, in response to an application requesting exclusive access and no shared credits are available in the shared credit pool, the processor revokes a currently shared credit from a currently operating application that is holding a shared credit and assigning the revoked credit to the application requesting exclusive access.

11. A computer program product comprising a computer-readable storage medium having program instructions embodied therewith the program instructions executable by a computer processor to cause the computer processor to perform a method, comprising:

storing the at least one shared credit in a shared credit pool;

storing at least one exclusive credit in an exclusive credit pool;

executing, via a processor, an application;

outputting, via the application, an access request to perform a data processing operation via an accelerator;

determining an availability of at least one shared credit corresponding to the accelerator and assigning the available shared credit to the application;

submitting, via the application, a request for shared access of accelerator using the assigned available shared credit;

providing access to the application that has requested the shared access by identifying the available shared credit, and assigning the available shared credit to the application when it is available in the shared credit pool, wherein the at least one shared credit is different from the at least one exclusive credit; and transferring a shared credit from the shared credit pool to the exclusive credit pool in response to the application requesting exclusive access to the accelerator, wherein the transferred shared credit is included among the at least one exclusive credit.

12. The computer program product of claim 11, further comprising providing access to an application that has requested exclusive access to the accelerator by identifying an exclusive credit and assigning it to the application when at least one exclusive credit is available in the exclusive credit pool independent from an availability of shared credits in the shared credit pool.

13. The computer program product of claim 12, further comprising denying access to an application that has requested shared access to the accelerator and no shared credits are available in the shared credit pool.

14. The computer program product of claim 13, further comprising transferring a shared credit from the shared credit pool to the exclusive credit pool in response to an application requesting exclusive access to the accelerator.

* * * * *